July 21, 1959 W. B. HILDMANN 2,895,148
CONTINUOUS-FLOW ROUNDING, JOINTING, AND CASING-IN MACHINERY
Filed April 30, 1952 9 Sheets-Sheet 1
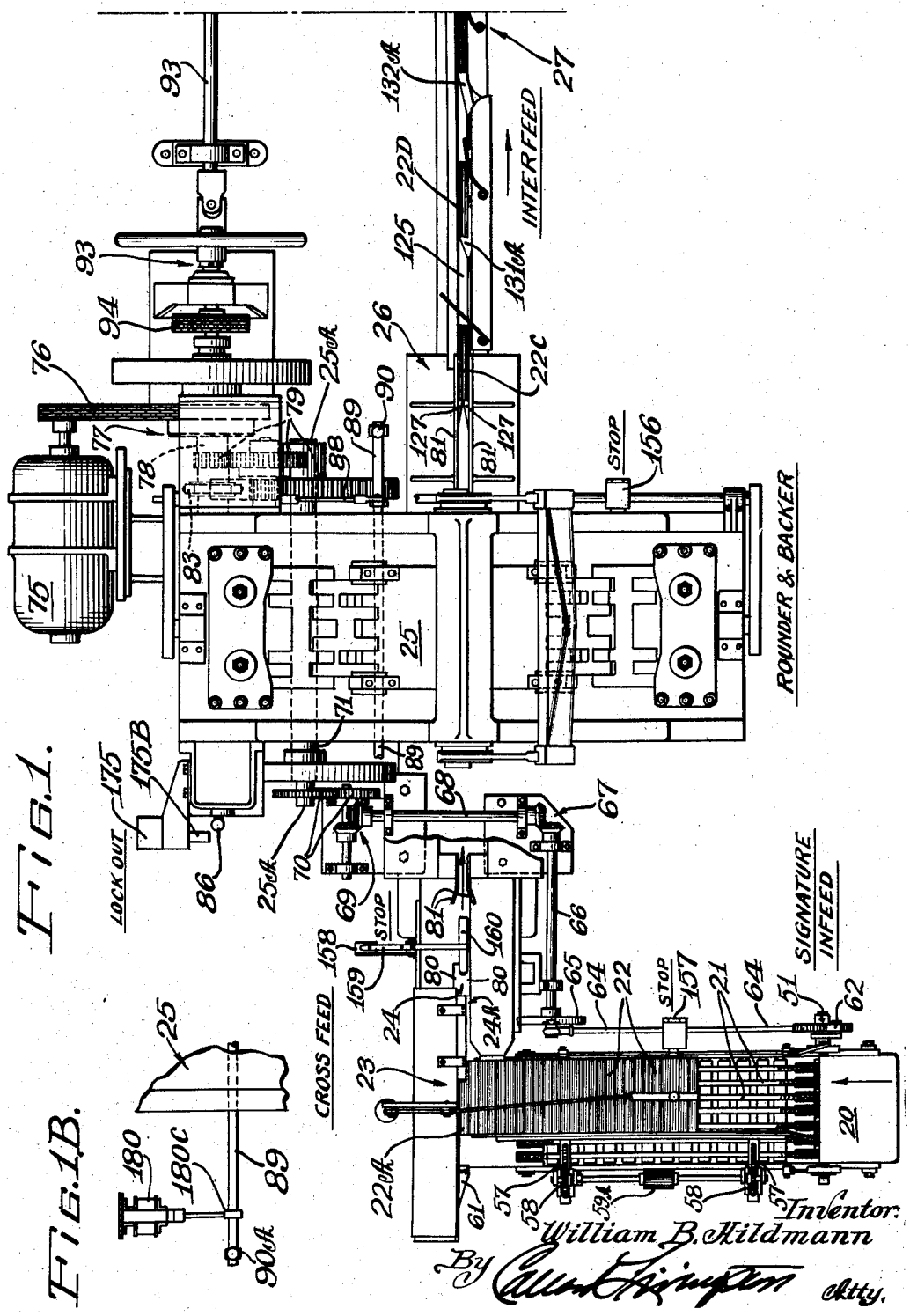

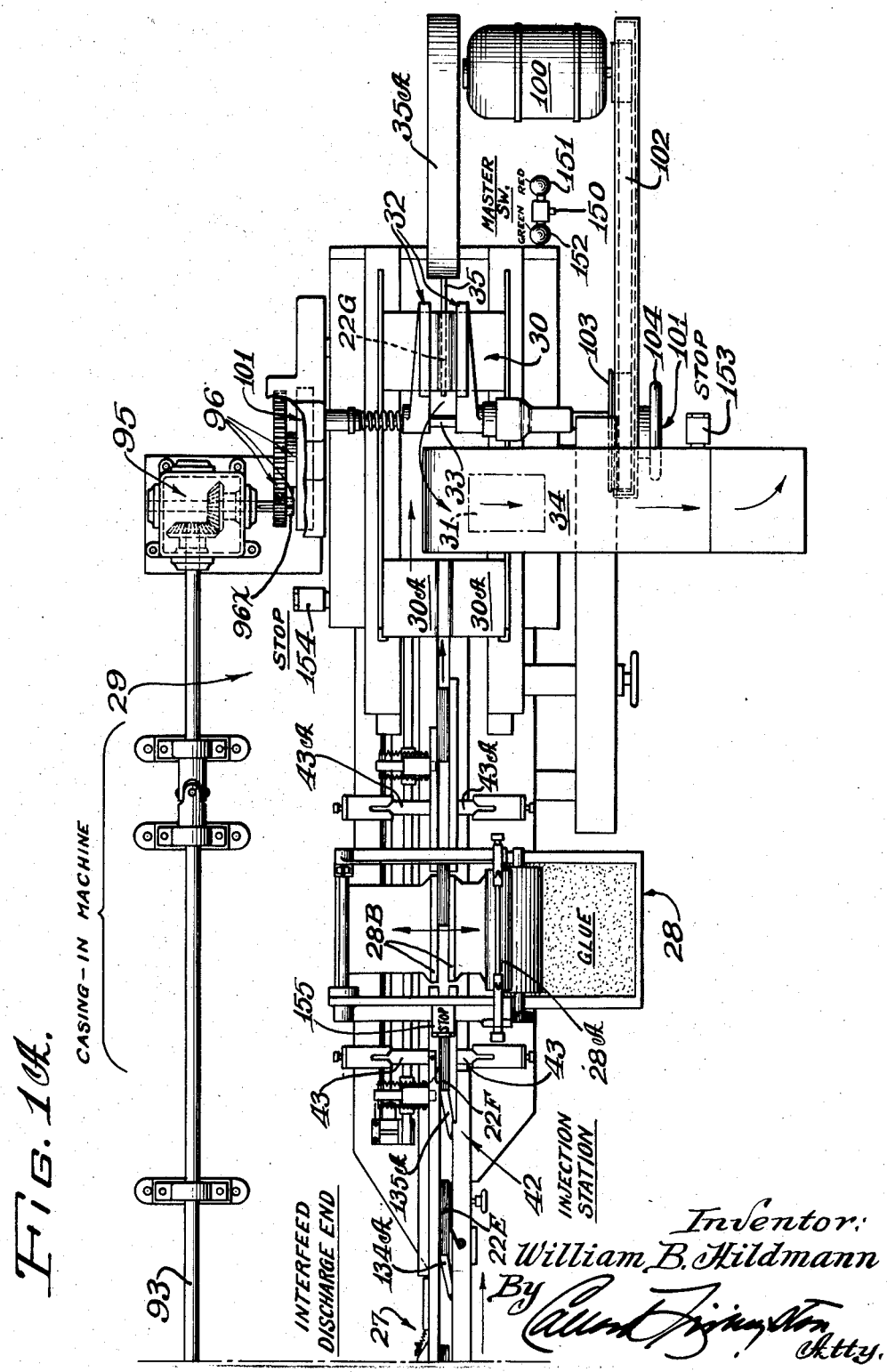

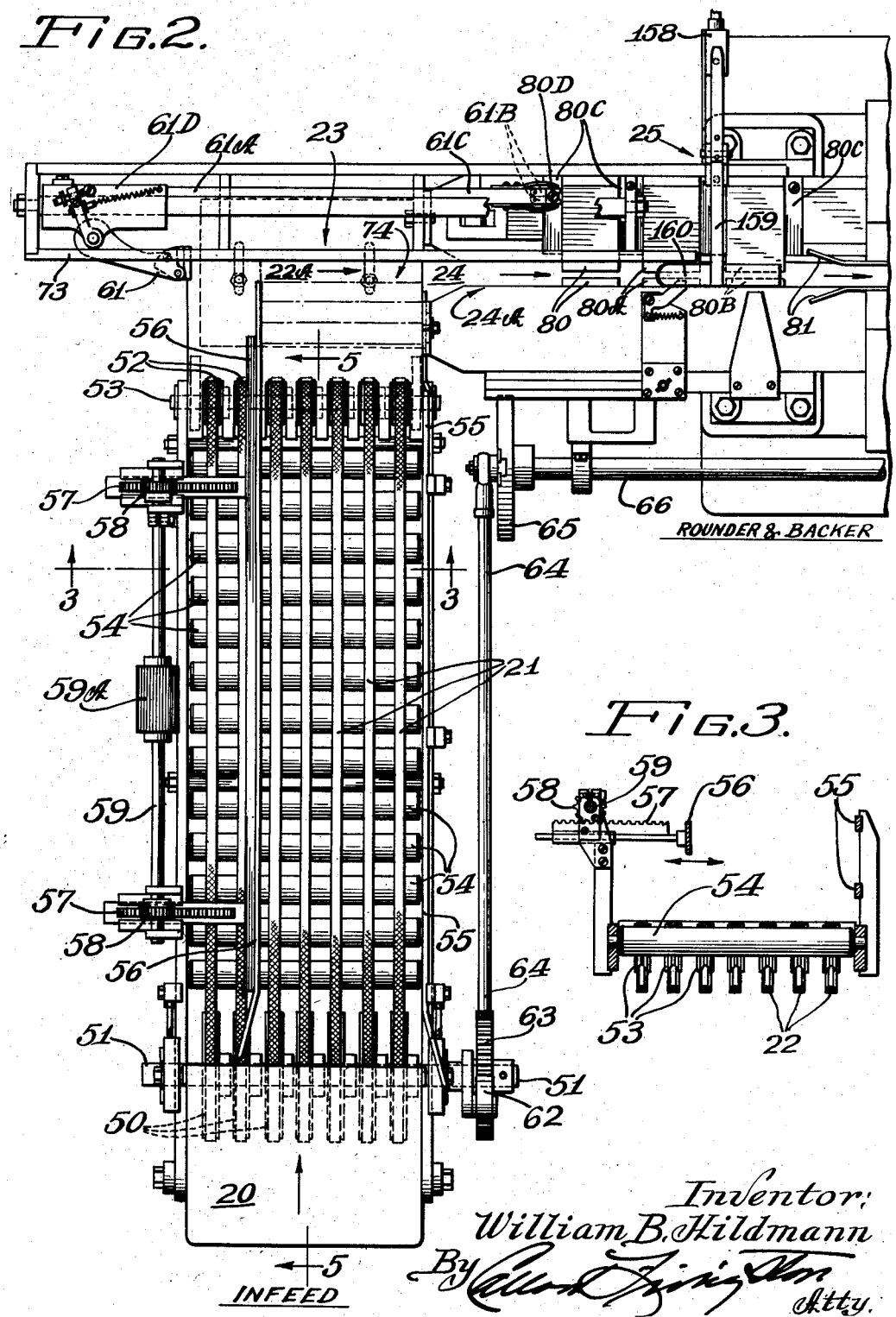

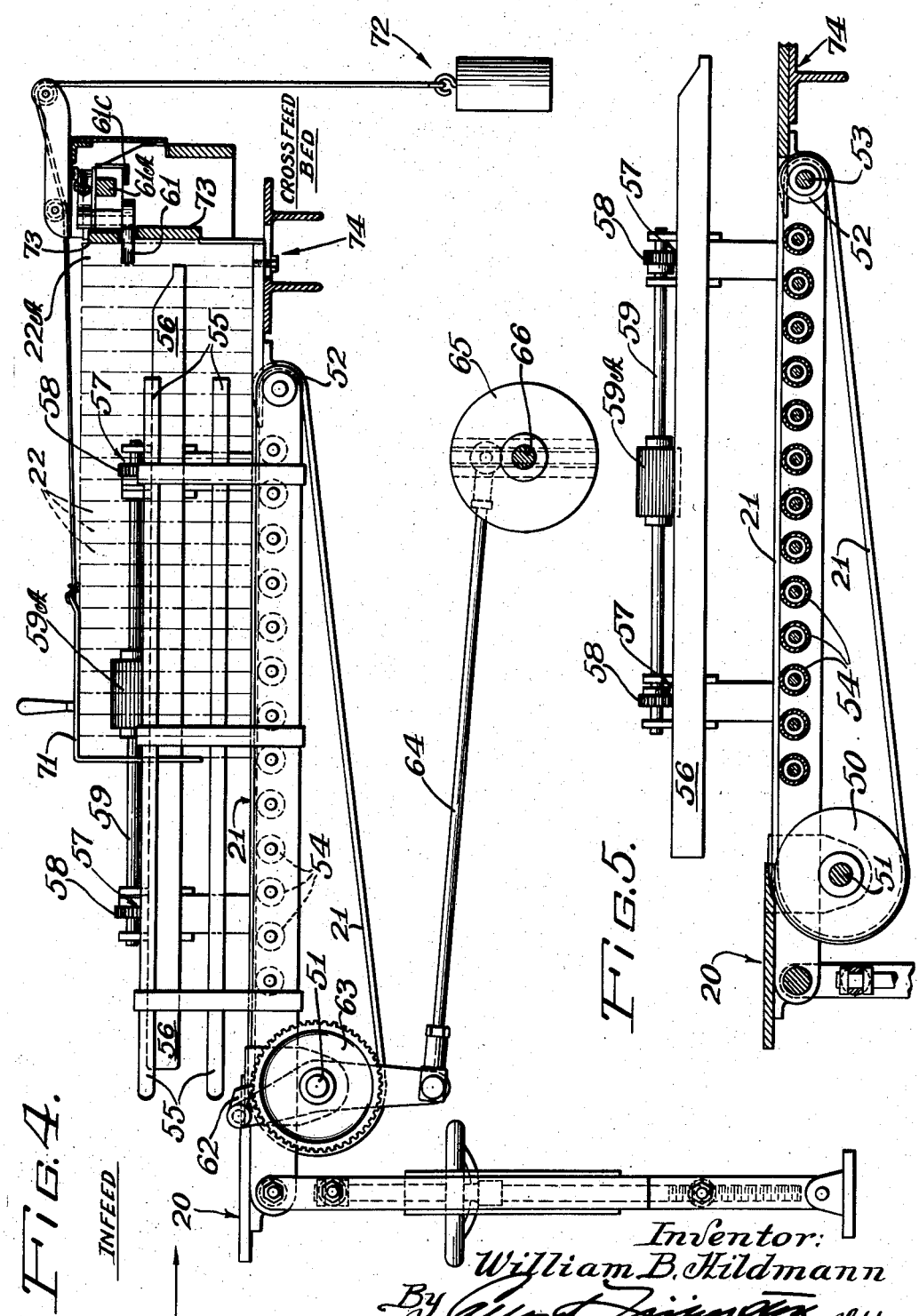

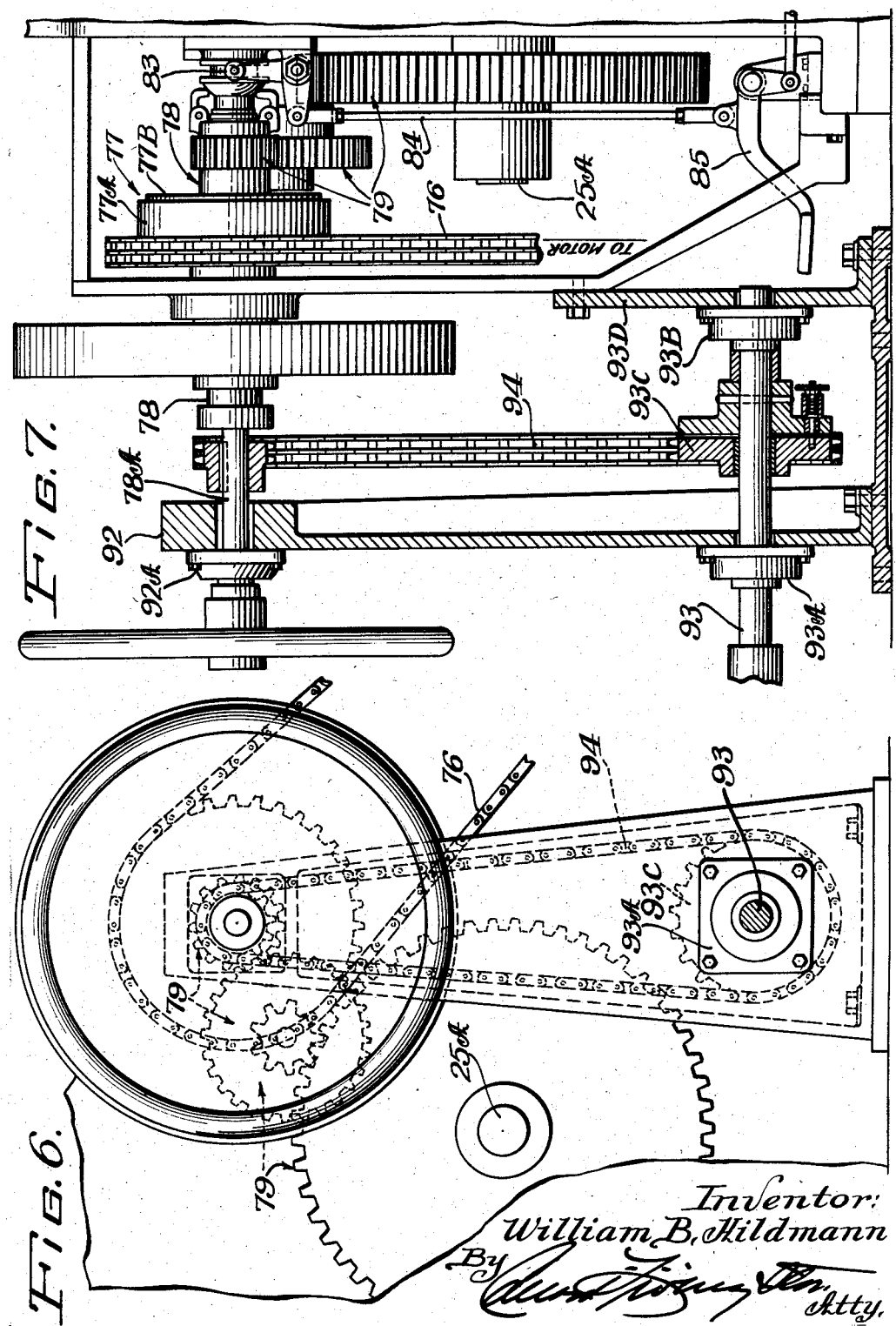

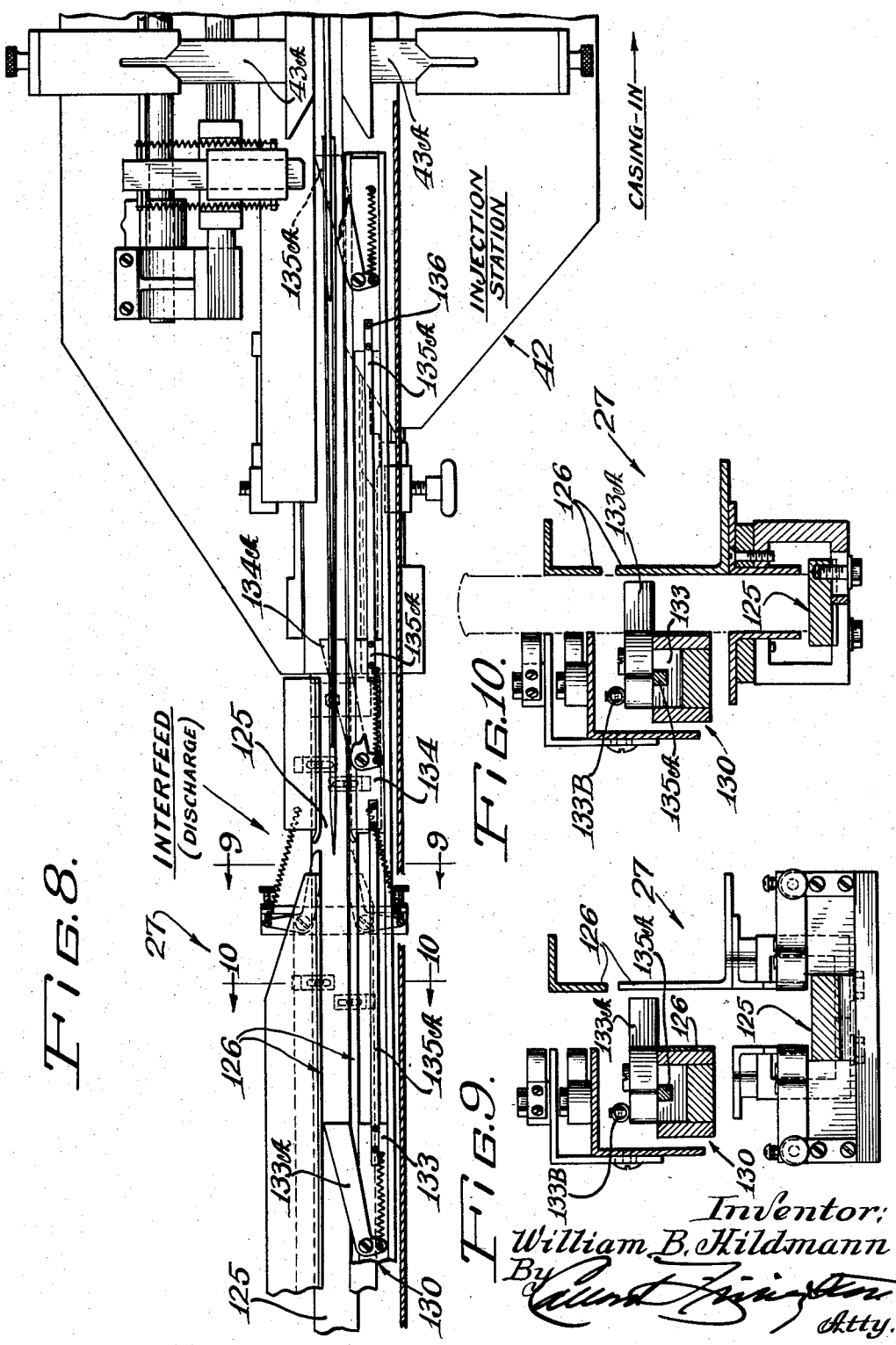

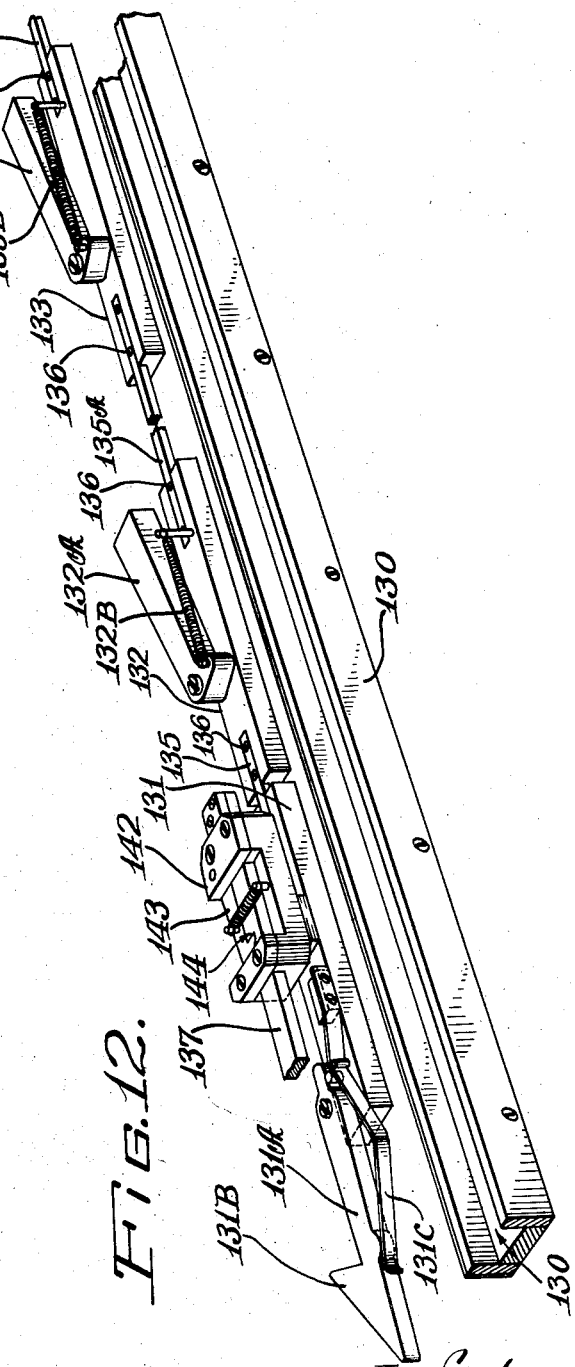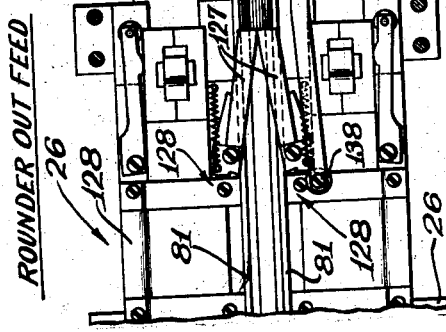

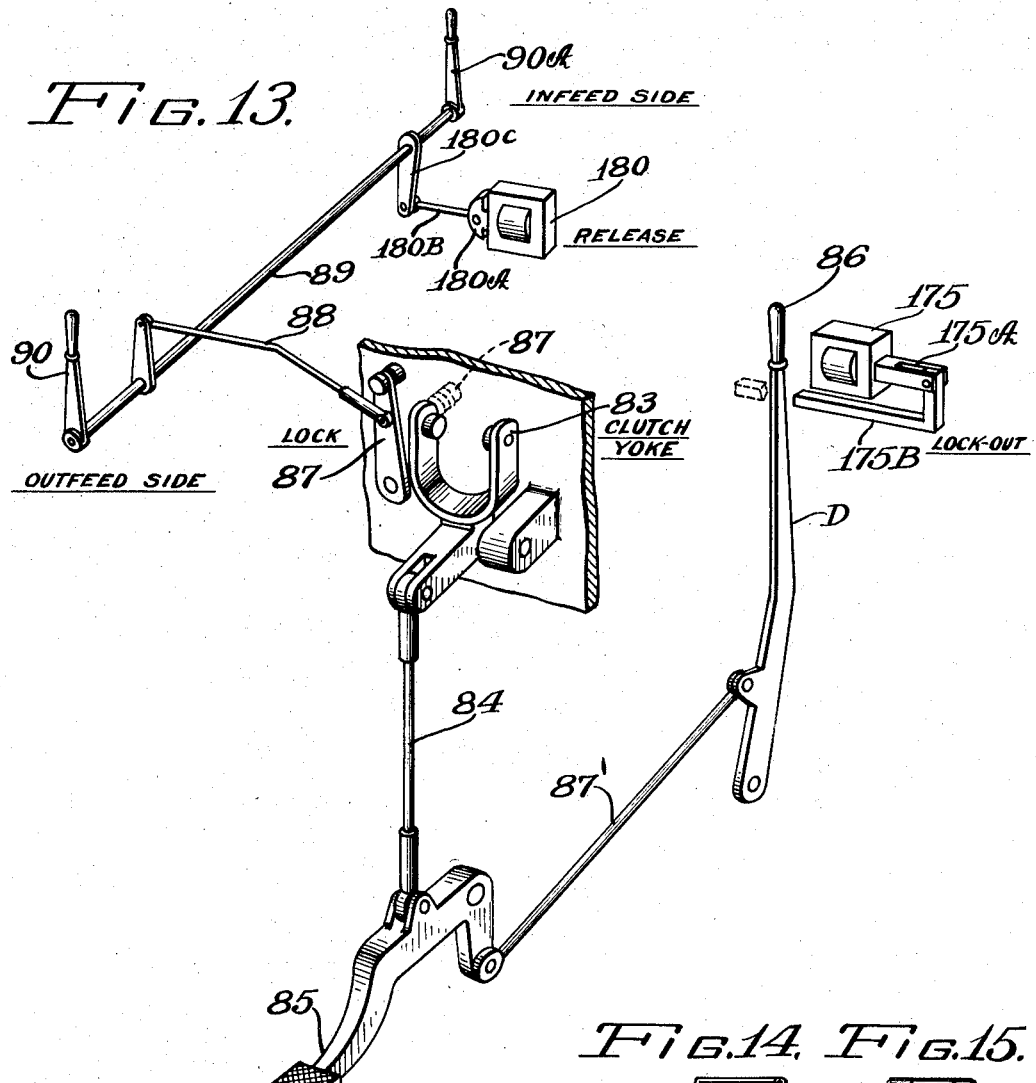
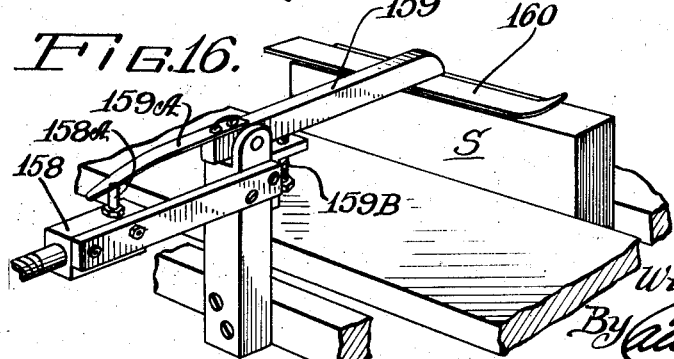

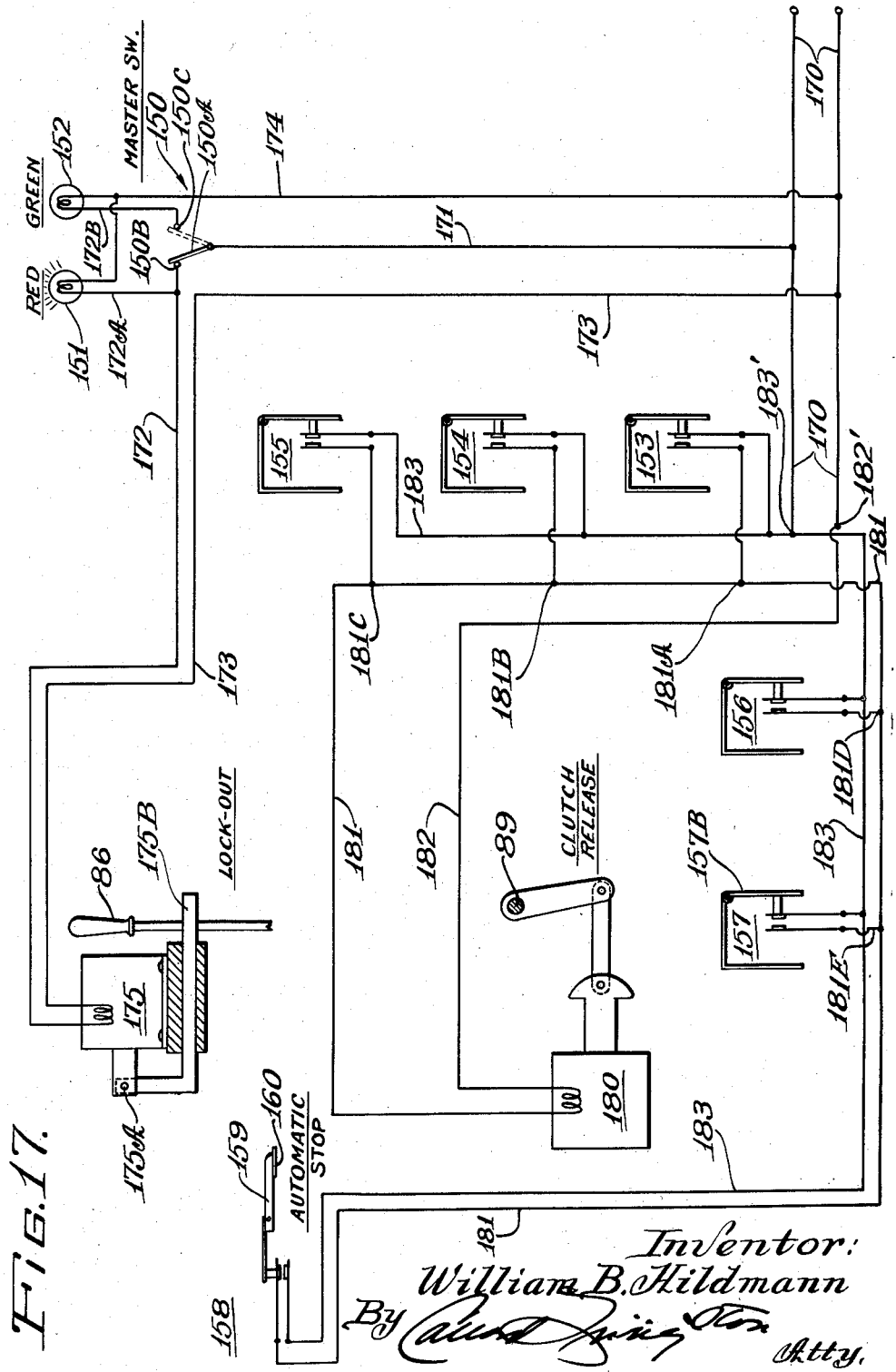

United States Patent Office 2,895,148
Patented July 21, 1959

2,895,148

CONTINUOUS-FLOW ROUNDING, JOINTING, AND CASING-IN MACHINERY

William B. Hildmann, Chicago, Ill., assignor to Brock & Rankin, Inc., Chicago, Ill., a corporation of Illinois Application April 30, 1952, Serial No. 285,255

9 Claims. (Cl. 11—1)

This invention pertains to improvements in bookbinding machinery and methods and has as its general objective the provision of means for making the heretofore distinct and discontinuous operations of rounding-and-backing on the one hand and casing-in on the other hand, a unified, continuous-flow operation.

A more particular object is the cooperative combination of a rounding-and-backing machine, a casing-in machine, and certain signature-infeeding and interfeeding mechanisms all driven by the rounding and jointing machine through certain synchronizing driving connections with the casing-in machine and the several infeeding and interfeeding mechanisms operating as slave units to the rounding and jointing machine.

A further object is the provision of automatic signature-infeeding and cross-feeding mechanism coacting, through a safety synchronizing coupling, with signature-advancing means in a rounding and backing machine; together with interfeeding and interdriving mechanisms coupling the rounding and backing machine with a casing-in machine, and driving the latter in timed relation to the former and to the operation of the aforesaid infeeding, cross-feeding, and interfeeding means.

Additional objects relate to the provision of certain safety and supervisory control means for synchronously coacting rounding and backing, and casing-in machines, as hereinabove characterized.

Additional objects and aspects of novelty and utility in the disclosed improvements relate to details of the construction and operation of the embodiment described hereinafter, and illustrated in view of the annexed drawings, in which:

Figs. 1 and 1A are complementary top plan views of a combined rounding and backing machine, an automatic infeed machine, and a casing-in machine, Fig. 1 showing the infeed and the rounder and backer, while Fig. 1A shows the casing-in machine; Fig. 1B is a fragmentary shaft detail complementary to Fig. 1;

Fig. 2 is a top plan view, to enlarged scale, of the automatic infeed machine and the infeeding portion only of the rounder and backer, illustrating also the special coupling means between said infeed and rounder;

Fig. 3 is a cross-sectional view along lines 3—3 of Fig. 2 showing the infeed belts on the automatic infeed;

Fig. 4 is a side elevation of the automatic infeed unit with parts of the feeding bed leading into the rounder and backer shown in cross-section;

Fig. 5 is a longitudinal sectional view through the infeed machine, as seen along lines 5—5 of Fig. 2;

Fig. 6 is a front elevation, to enlarged scale, of the power take-off unit of the rounding and backing machine;

Fig. 7 is a vertical sectional view through the power-take-off means for the casing-in machine, taken at the rounding and backing machine, parts of which are seen in Fig. 6;

Fig. 8 is a fragmentary top plan view, partly in section, of the interfeed bed near the discharge end thereof at the casing-in machine;

Figs. 9 and 10 are cross-sectional details through the interfeed bed, taken respectively along lines 9—9, and 10—10 of Fig. 8;

Fig. 11 is a horizontal section, to enlarged scale, taken through part of the interfeed bed as it leaves the rounding and backing machine, and showing especially the signature advancing pawl means;

Fig. 12 is a fragmentary, exploded perspective of parts of the signature-feeding pawl means for the interfeed, which are seen also in plan in Fig. 11;

Fig. 13 is a skeletonized schematic layout in perspective of the clutch-control mechanism for the power-take-off from the rounder and backer for synchronously driving the casing-in machine;

Figs. 14 and 15 are respectively side and front elevational fragments of one of the supervisory safety-switch units;

Fig. 16 is a fragmentary perspective view of another supervisory safety switch means;

Fig. 17 is a circuit diagram for the master safety-control and supervisory means.

*Introductory*

In the bookbinding arts the well-known rounding and jointing machine (also referred to as a rounding and backing machine, or simply as a rounder) is employed to receive gathered and trimmed signatures, usually stitched, and impart a rounded shape and slight jointing flare to the back or hinge edges of the gathered sheets, preparatory to the casing-in operation.

The rounding is achieved by use of a tamping die, having a rounded cavity, which is forced down upon the binding or back edge of the gathered signatures, while they are seized by automatic clamp means with the free or side opening edges of the sheets opposite the back resting on a convex die.

After the gathered book of the signatures has been suitably rounded and backed (or jointed) it is generally transferred by operatives to an equally well-known device called a casing-in machine, which applies a hinged set of covers thereto; and as a part of this operation, the rounded back of the book of signatures is automatically coated with glue, and the fly-leaves are coated with paste, as the book of signatures moves along for conjunction with the covers at the casing-in station.

The respective operations of both the rounding and backing machine and the casing-in machine require an accurately timed step-by-step internal transport, and critical positioning, of the book forms or signatures therein, by reason of which these machines each include their own advancing or conveying means and individually timed drive mechanisms to seize and discharge the books one at a time; and it has long been necessary for operatives to hand-feed, as well as remove, the gathered signatures or forms into both the rounder and backer and the casing-in machine.

Such manual feeding and removing operations not only require additional labor and slow down production, but occasion various losses because of faulty timing or attention in handling of the books as they enter and leave these machines.

The present improvements make possible a continuous processing by coupling, feeding, and controlling the rounding and backing machine for synchronous coaction with the casing-in machine, so as to eliminate most of the objectionable handling operations heretofore necessary in these phases of book manufacture, and to speed up production while reducing losses from rejects and other causes.

*Generalized operation*

Referring now to Figs. 1 and 1A (which are understood to be readable together) the automatic infeed and the rounder and backer are shown in Fig. 1, while the casing-in machine is shown in Fig. 1A.

The infeed is of a type disclosed and claimed in my U.S. Patent 2,645,327 for improvements in a Jogfeeder for Books, to which reference may be had for details of construction or operation not elaborated upon herein.

The automatic infeed comprises a feeding table 20, a feeding bed including a plurality of parallel feed belts 21 upon which the book signatures 22 rest for transport toward a discharge station 23 opening into a transverse cross-feed means, leading into an infeed channel 24 to the rounding and backing machine, which is generally indicated at 25 (Fig. 1).

From the rounder, the books of signatures or forms leave the discharge station 26 and enter an interfeed channel or alley 27 for transport, step-by-step, to the infeed station at the initial gluing means 28 (Fig. 1A) of the casing-in machine 29 (Fig. 1A).

Only the backbone or hinge portions of the signature leaves are coated by the gluing unit 28 at this station, the signatures hesitating here in their timed movement while a transversely reciprocable glue roller 28A rolls laterally across the backs for the initial coating in the direction of arrows at 28B.

An application of paste to the outside, or fly-leaves, occurs at another station interiorly of the casing-in machine 29 through the agency of conventional roller means (not seen) transiently engaged as the form or filler 22G rises therebetween and pushes home into a waiting pair of horizontally-spread casing covers 30.

The blank cases 30 which are to be applied to the rounded and backed signatures are customarily spread open and stacked flat in a hopper, as at 30A, to be automatically fed one at a time into the position occupied by the case 30, spread in a horizontal plane across the path of a signature form which will rise from below into the covers and cause the latter to be folded around the signature, which thus becomes "cased-in" and continues to move upwardly in between a pair of rocking clamp jaws 32.

Automatic infeed

Referring now to Fig. 2 and the enlarged top view there shown, the infeed consists of the table 20 and the parallel feed belts 21 trained over sheaves 50 on shaft 51, at the infeed end, and over sheaves 52 on shaft 53 at the discharge end.

Idling cross-rollers 54 are journaled between the main frame members (Figs. 3 and 5) to support the belts 21 when the latter are loaded, as in the view of Fig. 4.

The signatures 22 travel between guide rails 55 and 56, the latter being laterally adjustable (Fig. 3) by reason of mounting on sliding racks 57 driven by pinions 58 on a long adjusting shaft 59 (see also Figs. 4 and 5).

By turning the grasp 59A, shaft 59, rotating pinions 58, will shift the racks 57 and move the guide rail 56 toward or away from the opposite rails 55 to accommodate signatures of various width.

A feature of the infeed is its intermittent relaxation drive, achieved through employment of stiff conveying belts 21 which are pushed forwardly by sheaves 50 on their upper runs upon which the signatures rest, by reason of which the belts relax or back-up slightly at the completion of each driving stroke, to relieve pressure on the foremost or leading signature 22A (Fig. 1 or 4) so that the lead signature can be picked off by a cross-feed pawl 61 (Figs. 1, 2, and 4).

The intermittent drive means for the infeed conveyor belts is an oscillating pawl 62 (Figs. 2 and 4) floating on the front shaft 51 and engaging in a ratchet gear 63 fixed on said shaft.

The ratchet pawl 62 is oscillated by a reciprocating link 64 connecting to an eccentric 65 (Figs. 2 and 4) on a synchronizing counter shaft 66 which is geared into the drive mechanism of the rounding and backing machine by means (Fig. 1) of mitre gears 67, stub shaft 68, mitre gears 69, pinions 70, to a timed cam shaft 25A of the rounder and backing machine.

The infeeding signatures 22 (Fig. 4) are compacted by means of a drag hook 71 pulled by a traction cord and weight means 72, so that the leading signature 22A is always registered firmly against the cross-feed guide rails 73, between which the cross-feed pawl 61 reciprocates along its slide bar 61A (Fig. 2, also).

Underlying the position of the leading signatures 22A is a cross-feed bed 74, which is aligned with the infeed bed 24 of the rounder (as in Fig. 2).

Cross-feed synchronization

An important feature of the new automatic infeed control and synchronization resides in providing an independent drive means for the transverse or cross-feeding of the signatures from the infeed bed at station 23 (Fig. 1) into the rounder infeed channel 24 at station 24A.

As will hereinafter more fully appear, the rounder and backer is provided with reciprocating signature-feeding jaws 80, 80A, 80B, adjoining the feeding channel 24 (Fig. 2, particularly). These jaws 80 are carried on reciprocating (left to right) bed plate means 80C, and moved back and forth in coordination with other driven instrumentalities of the rounding and backing machine.

In order to feed signatures into the position for seizure by the first set of jaws 80, at the proper instant, the cross-feed pawl 61 is yieldingly coupled for movement in step with the advancing jaws 80, etc., by means of a break-away coupling consisting of a pair of spring-urged coupling jaws 61B on a drive arm 61C attached to the pawl glide sleeve 61D reciprocating on rod 61A.

The coupling jaws 61B seize a pin 80D on the reciprocable bed plate 80C for the advancing jaw means 80, 80A, etc., and thereby cause the cross-feed pawl 61 to move absolutely in step with said jaws as the signature-conveying means of the rounder.

Should the cross-feed channel or signatures jam up in the infeed channel of the rounder for any reason, the cross-feeding pawl means 61 would be automatically disconnected from the conveying jaw means 80 to avoid injury to the machines or the books; and should the condition be cleared (as by attendants removing jammed books, etc.) the cross-feed will be automatically recoupled in absolute step with the conveying jaw means 80.

Referring now to certain parts of the rounding and backing machine, as viewed in Fig. 1, it will be understood that this machine has its own power source in the form of an electric motor 75 driving, through chain belt 76 and clutch 77, a main drive shaft 78, all of which constitutes original equipment forming part of the known rounding and backing machine, as does the timed cam shaft 25A, heretofore alluded to; and said cam shaft 25A is in turn driven from the main drive shaft 78 of the rounder through gears 79.

The various rounding and backing instrumentalities of the machine 25 are not significantly discernible in the view shown, and are not described in detail since they do not per se form part of the invention, it being sufficient for present purposes to understand that such instrumentalities are all operatively coordinated and synchronized to be driven from the main drive shaft 78, and in particular that the cam shaft 25A is rotated in accurately timed relation to such coordinated operations, including the intermittent opening, closing, and reciprocation of certain book advancing or conveying means, part of the machine, such as the conveyor jaws 80, 80A, 80B, seen to advantage in Fig. 2, which project into the conveying bed 24 of the rounder.

The rounder conveyor jaws or clamps 80 automatically and intermittently close upon book signatures delivered into the infeed station 24A of the rounder, and move toward the right to advance the signatures from one set of jaws (i.e. 80 to 80A; 80A to 80B, etc.) so that the forms progress toward the right (Fig. 2) to be delivered ultimately into the outfeed channel guides 81, these signatures having meanwhile, in the course of such travel, been subjected to the various rounding and backing operations, during their intermittent advances in the well-known manner, until such signature forms, fully rounded and jointed, or backed, arrive at the discharge or outfeed station 26 (Fig. 1), still traveling in upright position (backs uppermost) between the guide rails 81, as exemplified by the particular book of signatures indicated at 22C.

It is emphasized at this juncture that, according to the previous methods of processing books through the rounder and backer, the forms would be manually fed into the same at the infeed station 24A (Fig. 1), leading into channel 24 and the first set of clamp jaws 80 to the right thereof (Fig. 2); and the finally rounded and backed form would likewise be manually removed from the discharge section 26.

The rounder and backer is operatively controlled by means of the clutch 77 (Fig. 1) which can be actuated from several positions, as for example by a hand lever 86 near the left-hand end of the cam shaft 25A (Fig. 1).

The clutch and control means 77 is shown in greater detail in Fig. 7, wherein it will be seen that the motor chain 76 drives an outer clutch member 77A, which in turn meshes with a driven clutch member 77A driving the heretofore mentioned gears 79, on a stub shaft portion which is axially shiftable by means of a yoke lever means connected by link rod 84 to a foot pedal 85.

Control of the clutch means 77 is extended to another position on the opposite side of the machine (Fig. 1) from the clutch, and somewhat near the infeed station 24A, where a hand lever 86 is located and connected by a link rod 87' (see Fig. 13) to the foot pedal 85.

In order to hold the clutch in running position, it is locked by means of a blocking dog 87 (Fig. 13) adapted to pivot in behind the yoke 83 in response to movement of a link 88, eccentrically connected to a rock shaft 89 running through the machine in parallelism with the cam shaft 25A.

Near the outfeed station 26 of the rounder, there is located a hand lever 90 on said rock shaft 89 (Fig. 1), by which the blocking dog 87 of Fig. 13 can be controlled; and on the opposite side of the machine is situated a second hand lever 90A, also fast on the rock shaft 89, for similarly controlling the clutch dog from a position near the infeed station. Both tripping or dog levers 90, 90A, are seen in Fig. 13, but only the lever 90 appears in Fig. 1, since shaft 89 is broken away in the view in order not to obscure other parts. However, Fig. 1B shows the continuation of shaft 89 and the second hand lever 90A thereon, as well as a clutch-releasing solenoid 180, hereinafter referred to.

Thus (Fig. 13) the clutch means 77 is moved into running condition by operation of the pedal 85 or the hand lever 86, and is locked in running condition by manipulation of levers 90 or 90A to move the blocking dog 87 in behind the yoke 83.

Likewise, once in running condition, the clutch may be released from positions at either the outfeed or infeed side of the machine by tripping out the levers 90, 90A, respectively. The control means 85, 86, 90, 90A, forms part of the old rounding and backing machine, but, as will hereinafter appear, is modified by supervisory control means later to be described.

*Synchronizing interdrive for casing-in machine*

Referring now to Fig. 1A, which depicts the casing-in machine, it is to be understood that this machine, like the rounder and backer, was heretofore operated as an independent unit, requiring manual loading and unloading or removal of the book forms therefrom, and accordingly such machine is provided with its own power source in the form of a motor 100, driving a main shaft 101 through a chain belt 102 and clutch means 103, controlled by a hand pull-out wheel 104.

Similarly to the rounding and backing machine, the various instrumentalities of the casing-in machine (for conveying, gluing, pasting, and covering-in the signatures) are actuated in precisely timed step-by-step coordination, necessarily synchronized with the main shaft 101 as the primary driving member.

According to the methods and means now disclosed for making the rounding and jointing and the casing-in operations a continuous process, the operation of the casing-in machine is synchronized with the operation of the rounder and backer, and the automatic infeed means, as well as certain interfeed means hereinafter to be described, by cutting out the power source 100 for the casing-in machine and driving the main shaft 101 of the latter in step with the main shaft 78 and cam shaft 25A of the rounding and backing machine, as will now appear.

From the main power shaft 78 (Fig. 7) of the rounding and backing machine, there is extended a take-off shaft 78A journaled in a bearing 92A fixed to a stanchion plate 92.

An interdrive shaft 93, journaled in a bearing 93A, also mounted on the stanchion plate, and a second bearing 93B mounted on a bracket 93D, is coupled to the shaft means 78 by a chain drive 94 trained over sprockets 78C and 93C, respectively.

The interdrive shaft 93 is extended (Figs. 1 and 1A) to the casing-in machine through suitable pillow blocks and provided with universal joints since the distance between the driving and driven machines is considerable.

At the casing-in machine, the long interdrive shaft 93 is geared into the main drive shaft 101 at a predetermined reduction ratio by means of mitre gears 95 and spur gears 96, the local clutch means 103—104 being out to disconnect the local driving means or motor 100 so that the driving and control of the entire casing-in mechanism is extended from the rounder and backer and is, moreover, precisely coordinated by the gearing 96 for predetermining the rate of operation of the various known instrumentalities of the casing-in machine to make possible a continuous flow of book forms from the rounder into and safely through the casing-in machine through a timed interfeed means, as will now appear. The pinion 96X is slidable out of driving engagement with its companion synchronizing gears to disconnect the driving power from interfeed shaft 93, since it may be necessary to operate the casing-in machine as an independent unit to process certain types of backs.

*Synchronized interfeed*

The continuous flow of book forms or signatures through the two heavy procesing machines, that is to say, the rounder and the casing-in machine, requires a transfer of the forms one-by-one from the outfeed station 26 of the rounder to the point of injection at 42 (Fig. 1A) at the casing-in machine at a precisely regulated rate properly correlated to the rate of outflow from the outfeed station 26, on the one hand, and the rate of seizure of the signatures or fillers at the injection station 42, on the other hand.

To this end, there is provided the interfeeding channel means 27 connecting the two stations 26 and 42 as briefly mentioned in the general description; and an important feature of this part of the combination is the provision of book or signature-advancing means in the nature of reciprocating pawls which are driven by, and in exact step with, certain advancing jaw means in the casing-in machine.

Reverting to Fig. 1A, the discharge end of the interfeed channel 27 confronts the injection or infeeding end or station 42 of the casing-in machine at which is the first of several spaced pairs of conveyor or advancing jaws 43, 43A, which reciprocate jointly in the direction of travel of the signatures toward and past the gluing unit 28.

The jaws 43, etc., open and close automatically, being open at their back positions, shown in Fig. 1A, so that the foremost incoming signatures 22F will lodge in between said first pair of jaws 43 to be clamped by the latter upon closing at the beginning of their advancing stroke (to the right) to be moved in between the guide flanges 28B of the gluing unit long enough for the gluing roller 28A to roll across the backbone thereof for the coating purposes heretofore mentioned.

Upon the back stroke of the jaws 43, 43A, etc., the latter open and leave the signatures at their respectively advanced positions, so that upon the ensuing back stroke of the next leading pair of jaws (as 43A) the advanced signatures will again be seized and carried forward another step, and so-on until the signatures progress into position beneath the spread cover boards 30 at the casing-in station at right side of the machine (Fig. 1A).

The final advancing step of the leading signature form will be to a point below the form 22G, where the said form will be impaled upon one of a plurality of saddle blades 35, carried on an endless chain of such blades, not seen but mainly housed within a hood 35A.

The impaled signature form will be carried straight up by the blade 35 into the spread covers or casing 30 so as to carry the latter upward with it, folding the covers onto the form, as in the condition of a fully bound, closed book, which is now thrust in between the picker or rocker jaws 32.

The jaws 32 will thereafter firmly grip the bound book and automatically be rocked toward the left, lifting the book off the saddle blade 35, and dropping it onto the discharge chute 34 as heretofore explained.

Additional pawl means are provided to carry the incoming signatures fully into the injection position for seizure by the first pair of conveyor jaws 43, as will shortly be described.

Referring now to Fig. 11, the interfeed channel 27 includes a long bed plate structure 125, which runs from the rounder to the casing-in machine, terminating as in Fig. 8 at the injection station 42 thereof.

Spaced guide rail means 126 (Figs. 8 and 11), adjustable as to width, maintain the signatures 22C, 22D, etc., throughout their travel in the same upright condition as when they leave the rounder and backer. A cross-sectional view of the interfeed channel structure is seen in Figs. 9 and 10.

As viewed in Fig. 11, when the rounded signatures approach the discharge station 26 they are finally advanced by a pair of spring-urged pivot jaws 127 carried on a reciprocating bed structure 128 located beneath the plate means defining the discharge position 26.

Mounted at one side of the interfeed channel (Fig. 11) is a slide channel 130, constructed as shown in Fig. 12, and in which are serially seated a plurality of slide blocks 131, 132, 133, there being another such block 134 apparent in Fig. 8.

Pivoted on each slide block is a corresponding feed pawl 131A, 132A, 133A, 134A, respectively, each spring-urged to project into the feed bed or channel between rails 126 to engage the trailing end of a signature.

The aforesaid slide blocks are detachably linked for joint reciprocation by spacer link bars 135 and 135A, secured thereto as by screws 136. Link bars 135A are of the same length and as a group are longer than the bar 135 because, as will appear from inspection of Figs. 11 and 12, the first or leading pawl 131A faces oppositely from the remaining pawls 132A, etc., and thus gains in spacing by its length.

It will also be noted that the reversed lead pawl 131A has a hooked end 131B, urged by a leaf spring 131C, across the channel; whereas the other pawls in the interfeed are urged by coil springs such as 132B.

The purpose of the reversed hook pawl 131A is to hook behind the discharged signature 22C (Fig. 11), left in a position of advance by the pawls 127, to carry said signature to a further advanced position represented by the signature 22D' (Fig. 11) for subsequent engagement by the next succeeding pawl 132A, and so-on into the casing-in machine, as by pawl 135A (Fig. 8).

The joint reciprocation of the several interfeeding pawls 131A . . . 135A is effected by a stroke bar 137 (Fig. 11) connected by a pin 138 to the slide bed structure 128 for the pair of discharge pawls and are thus reciprocated synchronously with the advancing jaw means 80 of the rounding and backing machine.

The several link rods 135, 135A (Figs. 11 and 12) are removable in order that other bars of different length may be substituted for handling of different sizes of books.

The interfeed stroke bar 137 is made adjustable for the same reason and is slidably seated in a latch block 142 provided with a spring-seated latching and break-out dog 143 (Fig. 12) engageable in spaced camming notches 144 on the stroke rod.

Thus, as the slide bed structure 128 and discharge pawls 127 reciprocate (Fig. 11) in step with the advancing-jaw means 80 of the rounder and backer, the entire assembly of linked interfeed pawls 131A . . . 135A reciprocates positively in step therewith, so that the book signatures are moved along the interfeed channel step-by-step into the casing-in machine, and since the entire signature handling mechanism of the latter is actuated, as heretofore explained, in a predetermined timed relation to the operation of the rounder (and hence the operation of the interfeeding pawl means), the flow of the book elements is accurately regulated, and the only damage or stoppage that can occur from various kinds of jamming in the machines themselves, or in the several feeding units, is that which tends to be caused by structural or positional irregularities in the forms themselves, such as tilting, non-uniformity of shape or dimension, faulty folding, stitching, or the like.

However, since it is not thus far possible to eliminate occasional structural irregularities peculiar to book signatures or fillers, notwithstanding inspection and watchfulness of attendants, certain supervisory control and safety means are provided to minimize interference and damage from these causes.

For example, it has already been pointed out that the cross-feed means, particularly the pawl 61, is provided with an automatic break-away coupling (Fig. 2) at 61B—80D; and the associated relaxation feed-belt means 21 also affords a yieldable feed means up to the rounding and jointing machine 25.

Similarly, the entire interfeed pawl means will be disconnected by the break-away dog means 143 on the stroke bar 137 (Fig. 12) in the event of jamming in this section, thus affording automatic protection up to the casing-in machine.

It should also be noted here that each of the foregoing safety means, including the relaxation conveyor, the cross-feed and interfeed break-away couplings, is automatically self-restoring responsive to resumption of normal travel of the forms.

Supervisory operating control means includes a master control switch 150 located (Fig. 1A) near the end point of the book flow, namely, close to the discharge side of the casing-in machine. Associated with this master switch is a red lamp 151, signaling the running condition. The master switch, however, is operable only to permit the starting of the system, but cannot actually set the clutch means in running condition.

Situated at strategic control points are certain additional supervisory switches, both manual and automatic, for stopping (but not for starting) the system.

Close to the discharge chute 34 (Fig. 1A) at the casing-in machine is a first manual stopping switch 153; and on the opposite side of the machine therefrom is a second manual stopping switch 154. Still a third manual stop switch 155 is situated at the infeed or injection station 42 on this machine.

At the near side of the rounder and backer (Fig. 1) is a fourth manual stopping switch 156; while still another and fifth manual stop switch 157 is located at the right side of the automatic infeeding unit.

An automatic stop switch 158 is provided to supervise the cross-feeding of signatures into the rounding and backing machine, and is operated by a lever 159 having a shoe 160 beneath which the signatures pass just before entering the guide rails 81 in the rounder. Should the signatures be tilted in their plane of travel at this point, the shoe 160 and associated lever 159 would be rocked to actuate the switch 158 and release the master clutch in a manner that will more fully appear hereafter.

The construction of the automatic cross-feed supervisory switch 158 is shown in greater detail in Fig. 16. This switch 158 is of the micro-sensitive class having an operating plunger 158A engaged by a spring finger 159A on the rocker arm 159. Shoe 160 rides on the uppermost binding edge of the signature S and is adjustable to proper level by means of a leveling set screw 159A.

The stop switches 157, 156 (Fig. 1), as well as 155, 154, and 153 of Fig. 1A, are of the same micro-sensitive type as the switch 158, but as seen in Figs. 14 and 15 (which portray the switch 157 as representative) they are all provided with hinged strike plates, such as plate 157B, to be pressed against the switch-operating plungers, such as 157A, the plate portion 157B being adapted to be quickly struck or touched by the operative's hand for speedy release of the master clutch means.

The circuit arrangement for the aforesaid supervisory switch and control means is outlined in Fig. 17, wherein the master switch 150 is operable to connect power from source conductors 170, via conductor 171, contacts 150A, 150B, conductor 172 to the winding of a clutch-control or lock-out solenoid 175, the return circuit for which is completed by conductor 173 to the power line.

In the full-line stopping condition shown in Fig. 17, master switch contacts 150A, 150B also connect power to the red signal lamp 151 via conductors 172A and 174.

When the clutch-control or lock-out solenoid 175 is energized, as in Fig. 17, the plunger 175A thereof is attracted and moves the associated blocking arm 175B thereof across the line of movement of the clutch-operating hand lever 86 to prevent effective operation of the latter to actuate the clutch and start the machine, as will be more apparent from Fig. 13. The relative positioning of the solenoid 175 and clutch lever 86 is portrayed in Fig. 1 (upper center).

It will thus be clear that when the master switch 150 at the casing-in machine is "on red" or in the non-running safety position, the clutch lever 86, and the associated pedal 85 at the rounder and backer (Fig. 13) cannot be operated until solenoid 175 is released or deenergized from the master control position at the casing-in machine, as by operation of the master switch 150 by the attendant to the "green" or running position, in which condition contact 150A (Fig. 17) disengages contact 150B and assumes the dotted-line position to engage contact 150C, disconnecting power from conductor 172 and applying it to conductor 172B to energize the green lamp 152.

The several manual stop switches 153 . . . 157, as well as the automatic switch 158, are all connected in parallel to energize a clutch-releasing solenoid 180 via conductors 181, 182, the latter connecting with one of the power conductors 170 at junction 182', while conductor 181 is connected as at 181A . . . 181E to one contact of each of the switches 153 . . . 157, the remaining contacts of the latter switches connecting via conductor 183 to junction 183' with the remaining power conductor.

The two contacts of the automatic stop switch 158 are respectively connected to the conductors 181, 183, and in parallel with the aforesaid manual switches, so that closure of any of these switches 153 to 158, inclusive, will energize the clutch-release solenoid 180.

As shown in Fig. 13, the armature 180A of the clutch-release solenoid is connected by link 180B to a crank arm 180C on the clutch-dog rocker shaft 89 upon which the two hand-release levers 90 and 90A are fixed.

Thus, energization of the solenoid 180 (Fig. 13) will will result in rocking the shaft 89 to withdraw the clutch lock-in dog 87 and stop the entire combination.

*Summary of operation*

Gathered, trimmed, and (usually) stitched signatures 22 are manually loaded onto the relaxation conveying belts 21 of the automatic infeed unit (as in Fig. 1) and, assuming the system is otherwise in readiness, with the clutch means 103, 104, of the casing-in machine disengaged and motor 100 thereof stopped, the supervising attendant will operate the master switch 150 at the casing-in machine (Fig. 1A) to the running position, thus deenergizing the master lock-out solenoid 175 (Fig. 1) so that the clutch hand lever 86 can be moved to the running position by another attendant to engage the master clutch means 77, thereby connecting driving power to the main shaft 78 of the rounding and backing machine, as well as to the interfeed shaft 93. This starts the whole coordinated system, including the infeed, cross-feed, the rounder and backer, the interfeed, and the casing-in machine; but it should be observed that the master clutch means 77 must be locked in the running position by manipulation of hand levers 90 or 90A (Figs. 1 and 13) so that the dog 87 will lodge behind the clutch yoke 83.

In this running condition, the unidirectional infeed conveyor belts 21 will be pushed forward (only) intermittently in timed relation to the rotation of the main cam shaft 25A of the rounder and backer, owing to the driving connection to the infeed ratchet gear 62 therewith through the stroke rod 64 and gear connections 65, 66, 67, 68, 69, 70.

Concurrently with the aforesaid intermittent advance of the signatures by the infeed belts, the cross-feeding pawl 61 is reciprocated to pick-off the leading signature 22A and advance it into the cross-feed channel 24 where it will be seized by the reciprocating feed jaw means 80 of the rounder and passed into the rounding and backing machine between rails 81 to be therein subjected to the known processing afforded by this machine, after which the signature or book form will continue in step-by-step advance through this machine by the internal conveying means thereof to emerge at the discharge station 26 under urgence of the terminal discharge pawls 127, as exemplified by the form 22C.

The rounded and backed signatures now enter the interfeed and will be first picked up by the reciprocating hooked interfeed pawl 131A, as exemplified by the book of signatures 22D (Fig. 1), which will be advanced step-by-step to successive positions to be picked up by the succeeding reciprocatory interfeed pawls 132A . . . 135A into the injection station 42 of the casing-in machine (Fig. 1A).

By reason of the transmission of synchronized driving torque from the interdrive shaft 93 to the main shaft 101 of the casing-in machine (through synchronizing gear means 95, 96), the various instrumentalities of the latter machine are in concurrent, accurately coordinated operation in relation to the functions of the infeed, the cross-feed, the rounding and backing machine, and the interfeed, so that as the book forms are delivered into the injection station 42 (e.g. 22F) by the last of the interfeed pawls 135A, the reciprocating conveyor jaws 43, 43A, etc., of the casing-in machine will seize the forms and continue their step-by-step travel through the backbone gluing means 28 and thence beneath the spread of cover boards 30.

Then, in the known manner, vertically-traveling saddle blades 35 will rise into the form, lifting the same up toward the covers, and during this travel paste will be applied by roller means (not seen) and the form will be thrust into the covers 30, causing the latter to be folded upon the signature form as these members continue to move upwardly together into the rocker clamp jaws 32, as exemplified by the encased signature or filler 22G.

The rocker jaws 32 will thereupon swing over the discharge chute 34 and release the finished book.

The driving power may be effectively disconnected by the attendants at any one of five positions by operations of manual stop switches numbered 153 to 157.

Also, an improperly positioned book in the cross-feed channel 24 will actuate the automatic switch 158, as heretofore described.

The operation of any of the aforesaid manual or automatic stopping switches will result in energization of the clutch-release solenoid 180 to withdraw the hold-in dog 87 for the master clutch 77, thus stopping all operation.

The cross-feeding and interfeeding operations will automatically stop if signatures jam in these areas, owing to the break-away coupling means 61B—80D in the cross-feed (Figs. 1, 2) and 143—144 in the interfeed (Fig. 12).

The supervisory attendant at the casing-in machine controls the restarting of the machine through master switch 150 on the "red" signal or non-running condition (Fig. 17), since the clutch lever 86 (Fig. 13) will be locked-out by the lock-out solenoid means 175—175B—86 (Fig. 17), under these circumstances.

It is commonly required that the casing-in machine may have to process certain types of book signatures or fillers which will not be subjected to the operations of the rounding and backing machine, so that it is desirable to operate the casing-in machine alone in its original independent function; and for these purposes the entire power plant including the motor 100 and clutch means 103—104, etc., of the casing-in machine remain in readiness, and it is merely necessary to shift the small pinion 96X (Fig. 1A) to disconnect the interfeed shaft 93.

I claim:

1. Bookbinding machinery for effecting sequential, continuous-flow rounding and casing-in operations and comprising, in combination, a rounding-and-backing machine having a main drive shaft and an internal signature-feed synchronized with said shaft and internal rounding-and-backing mechanism; a casing-in machine having a main drive shaft and an internal signature-feed synchronized with internal casing-in mechanism; a power unit driving said main shaft of the rounding-and-backing machine; a synchronizing interdrive connecting driving power from said main shaft of the rounding and backing mechanism to the main shaft of said casing-in mechanism; a signature-interfeed communicating from the discharge side of said signature-feed of the rounding-and-backing machine to the injection side of the signature-feed of the casing-in machine; signature-feed means in the interfeed drivingly connected through a break-away coupling with the signature-feed of the rounding-and-backing machine; a signature-infeed mechanism connected with the infeeding side of the signature-feed of said rounding-and-backing machine and driven by power connected through a break-away coupling from said rounding-and-backing mechanism for driving the infeed in a predetermined synchronism respectively with the internal signature-feed of the rounding-and-backing machine, the interfeed, and the internal signature-feed of the casing-in machine, whereby to effect a continuous flow of book signatures into, through, and out of said rounding-and-backing machine, said interfeed, and said casing-in machine at a uniform predetermined rate.

2. Mechanism as set forth in claim 1 and further characterized by the provision of a hold-in clutch operable to connect said power unit to drive said rounding-and-backing machine; an electromagnetic release for said clutch; and a safety control circuit for said clutch including a stop switch having an operating member situated to be engaged and moved by an off-position signature in said infeed to release said clutch.

3. Mechanism as set forth in claim 1 and further characterized by the provision of a hold-in clutch operable to connect said power unit to drive said rounding-and-backing machine; an electromagnetic release for said clutch; an electromagnetic lockout operable to prevent operation of said clutch; and a control circuit including a switch located at the casing-in machine and operable to actuate said clutch release; together with switch means located at said casing-in machine for actuating said lockout.

4. In a bookbinding machine of the type including a feeding mechanism for travelling book signatures and page blocks seriatim relative to processing mechanism in said machine and intended to act thereupon, and means for synchronously coordinating the operation of said feeding and processing mechanisms, improvements comprising, to wit: a second feeding mechanism for travelling signatures and page blocks relative to said first feeding mechanism, and a break-away coupling drivingly interconnecting said second feeding mechanism with said first feeding mechanism and acting automatically to uncouple said feeding mechanism when greater than a predetermined driving resistance to the driving effort of the first feeding mechanism is presented thereto by the second feeding mechanism.

5. In a bookbinding machine having a feeding mechanism for advancing page blocks step-by-step serially along a course, said mechanism including a reciprocable member coacting in timed relation with the advancing movements of the page blocks, improvements comprising, to wit: a second feeding mechanism connected for operation in tandem with said first feeding mechanism, and including a reciprocable member and feed pawl means cooperable therewith for moving page blocks; together with break-away coupling means drivingly interconnecting said first and second mentioned reciprocable members, said coupling means including hook means urged by yieldable means with a predetermined force into drive-coupling engagement with cam means on the other reciprocable member, camming action between said hook means and said cam means disengaging the same automatically responsive to a feeding overload effectively greater than said predetermined force, whereby to uncouple said feeding mechanisms.

6. In a bookbinding machine, in combination, first and second book-feeding mechanisms each including normally co-reciprocable stroke members and respectively coacting book-feeding pawl means, and break-away coupling means including a pair of mutually interengaging coupling elements each connected to move with one of said stroke members and each having cam means cooperable with a complementary cam means of the other adapted to cam the said elements out of coupling engagement responsive to the application of a driving effort on one of said stroke members which is imparted to the other stroke member through said coupling elements, together with spring means normally urging at least one of said coupling elements into position for automatic coupling engagement wtih the other with a predetermined break-away force, such that an overload resistance on that one of said stroke members which is being driven by the other and which is sufficient to overcome said predetermined force of the spring means will permit said coupling elements to break away and uncouple, as aforesaid, said elements recoupling automatically following each break-away uncoupling as aforesaid but remaining recoupled only after said overload resistance is removed.

7. A combination comprising: a rounder and backer having a main drive shaft, rounding and backing means driven therefrom, and an internal signature feed synchronously driven in coaction with said rounding and backing means; and a casing-in machine having a main drive shaft, and hook processing means driven therefrom together with internal book feeding means driven synchronously in coaction therewith; a synchronizing interdrive comprising shaft and gear means drivingly connecting to the main shafts of both said machines whereby one of the latter is driven in a predetermined synchronism with the other as respects the movements of signatures and books therein by their respective internal feeding means; together with an infeed for the rounder and backer acting to deliver signatures in timed order to the internal feed means thereof and in synchrony with the action of the latter, said infeed having an anti-jamming coupling means automatically operable to release and engage a driven member in the rounder and backer which moves synchronously with said internal feed thereof; and an interfeed between the two machines acting to receive rounded and backed signatures from the rounder and backer and transport same step-by-step into the internal feed of the casing-in machine in synchrony with the action of the latter, said interfeed being driven through an automatic anti-jamming clutch means releasably connecting the same with a driven member in the rounder and backer and also moving in synchrony with said internal feed thereof; and motor means driving the main shaft of only one of said two machines.

8. In combination, a rounder-backer machine driving a separate and optionally independently operable casing-in machine through a synchronizing interdrive mechanism connecting power from a main drive shaft in the rounder-backer to a main shaft in the casing-in machine; a signature infeed mechanism delivering signatures into said rounder-backer; a signature-interfeed receiving signatures from said rounder-backer and delivering same to said casing-in machine; a synchronizing drive for said infeed mechanism connected to derive power from said main drive shaft of the rounder-backer; a synchronizing drive for said interfeed mechanism connected to derive power from means in said rounder-backer driven in step with said main shaft thereof; together with clutch means operable to connect and disconnect said last-mentioned main shaft and said interdrive mechanism simultaneously with a source of driving power; said clutch means being manually operable by a first control and manually locked in operated condition by a second control; an electromagnetic release operable to actuate said second control to unlock said clutch, an electromagnetic lock-out operable to block operation of said first control; and switch means selectively operable for actuating said electromagnetic release and lockout devices.

9. In combination, a rounder-backer machine driving a separate and optionally independently operable casing-in machine through a synchronizing interdrive mechanism connecting power from a main drive shaft in the rounder-backer to a main shaft in the casing-in machine; a signature infeed mechanism delivering signatures into said rounder-backer; a signature-interfeed receiving signatures from said rounder-backer and delivering same to said casing-in machine; a synchronizing drive for said infeed mechanism connected to derive power from said main drive shaft of the rounder-backer; a synchronizing drive for said interfeed mechanism connected to derive power from means in said rounder-backer driven in step with said main shaft thereof; together with clutch means operable to connect and disconnect said last-mentioned main shaft and said interdrive-mechanism simultaneously with a source of driving power; said clutch means including a manually operable first control for actuating same to operated condition; a manually operable holding means cooperable with said clutch means and first control for securing the clutch means in operating condition; electromagnetic release means operable to release said holding means and free said clutch; and a circuit for said release means including an automatic stop switch positioned for operation by a signature in said infeed mechanism to effect release of said clutch means responsive to a predetermined off-register signature movement in the infeed.

References Cited in the file of this patent

UNITED STATES PATENTS

| | | |
|---|---|---|
| 703,933 | Joyce | July 1, 1902 |
| 1,489,896 | Murray | Apr. 8, 1924 |
| 1,597,536 | Murray | Aug. 24, 1926 |
| 1,765,349 | Schramm | June 17, 1930 |
| 1,770,731 | Cahen | July 15, 1930 |
| 1,802,355 | Schramm | Apr. 28, 1931 |
| 1,851,135 | Schramm | Mar. 29, 1932 |
| 1,959,656 | Cahen | May 22, 1934 |
| 2,253,139 | Schmitt | Aug. 19, 1941 |
| 2,516,642 | Murphy | July 25, 1950 |
| 2,640,207 | De Florez | June 2, 1953 |
| 2,645,327 | Hildmann | July 14, 1953 |
| 2,689,639 | Federighi | Sept. 21, 1954 |
| 2,697,236 | McCain | Dec. 21, 1954 |

FOREIGN PATENTS

| | | |
|---|---|---|
| 24,442 | Great Britain | Dec. 21, 1914 |